United States Patent [19]

Sharp

[11] Patent Number: 4,945,543
[45] Date of Patent: Jul. 31, 1990

[54] GAIN MEDIUM FOR RADIANT ENERGY SOURCE

[75] Inventor: Richard C. Sharp, Concord, Mass.

[73] Assignee: Raytheon Company, Lexington, Mass.

[21] Appl. No.: 401,706

[22] Filed: Sep. 1, 1989

[51] Int. Cl.$^5$ .......................... H01S 3/22; H01S 3/223
[52] U.S. Cl. ............................................ 372/55; 372/59
[58] Field of Search ............................... 372/55, 59, 60

[56] References Cited

U.S. PATENT DOCUMENTS

| | | | |
|---|---|---|---|
| 3,704,428 | 11/1972 | Barry et al. | 372/55 |
| 3,810,043 | 5/1974 | Locke et al. | 372/60 |
| 4,085,385 | 4/1978 | Fein et al. | 372/56 |
| 4,194,170 | 3/1980 | Kurnit | 372/55 |
| 4,316,157 | 2/1982 | Dosi et al. | 372/60 |
| 4,612,642 | 9/1986 | Whitney et al. | 372/55 |

Primary Examiner—William L. Sikes
Assistant Examiner—Robert E. Wise
Attorney, Agent, or Firm—Christopher L. Maginniss; Richard M. Sharkansky

[57] ABSTRACT

A carbon dioxide ($CO_2$) waveguide laser is used to provide coherent infrared radiation. The mixture of gases in the laser includes helium, nitrogen, carbon dioxide, carbon monoxide, xenon and heavy hydrogen (deuterium). Carbon dioxide is the gain medium of the laser. During operation of the laser, a significant fraction of the $CO_2$ dissociates to CO and $O_2$. In the present invention, deuterium ($D_2$) in the presence of excess CO catalyzes the recombination of CO and $O_2$ back to $CO_2$, thus yielding significantly increased power output from the laser. The presence of $D_2$ also sustains a long sealed life from the $CO_2$ laser at an enhanced power output level.

9 Claims, 2 Drawing Sheets

GAIN MEDIUM FOR RADIANT ENERGY SOURCE

BACKGROUND OF THE INVENTION

The present invention relates generally to gas lasers and, more particularly, to a gas mixture comprising the gain medium within the sealed tube of a carbon dioxide waveguide laser.

The carbon dioxide ($CO_2$) waveguide laser is typically used as a source of coherent radiation in systems such as an infrared optical radar. In such an application, the properties of the $CO_2$ laser should include a high output power, so as to permit use at an extended range, and a long sealed-off lifetime, so as to minimize laser maintenance, more particularly, the replenishment of the gain medium gas.

The gas mixture which is initially pumped into a standard $CO_2$ waveguide laser typically contains carbon dioxide, nitrogen, helium and xenon. The carbon dioxide provides the gain, and the nitrogen provides excitation of the $CO_2$ by resonant vibrational to vibrational transfer (V-V transfer) of energy by collisions between molecules from its $V=1$ level. Large amounts of helium are included to help keep the gas cool; if the lower laser level becomes thermally populated the gain and output power of the laser fall. Small amounts of xenon in the gas mixture act as a low ionization potential gas additive.

As soon as the laser is turned on, i.e., the gaseous gain medium of the laser is pumped by electrons produced in a plasma discharge established directly in the gain medium, a significant fraction of the $CO_2$ dissociates to CO and $O_2$ through collisions with high energy electrons. If increased amounts of $CO_2$ are added to compensate for this loss, the temperature of the gain medium increases and the output power does not rise. Indeed, the power falls, since the percentage of helium has been commensurately reduced Conventional heterogeneous $CO$-$O_2$ recombination catalysts, such as a hot platinum filament, are not particularly useful here. These catalysts cannot be placed directly inside the laser bore without adversely affecting the optical quality of the laser resonator and causing a loss of output power. Such catalysts must be placed in an external gas ballast volume and the dissociated gas must then diffuse to this catalyst surface. The effective $CO$-$O_2$ recombination rate is then severely reduced by virtue of the long diffusion times, on the order of several minutes.

Homogeneous catalysts are therefore highly desirable for the waveguide laser. Such catalysts work directly in the laser bore where the plasma exists, and the diffusion time for the dissociation products to the catalyst is effectively zero. It is known that very small amounts of hydrogen ($H_2$) catalyze the recombination of CO and $O_2$ back to $CO_2$. However, by itself, $H_2$ cannot be added in sufficient amounts to retain all of the $CO_2$, without the output power of the laser dropping off. As an example, adding just one torr of $H_2$ to a 108 torr gas mix in a radio frequency excited waveguide laser is sufficient to increase the output power from a 4.5–5 watt level occurring with no $H_2$ to a 8–8.2 watt level. Additional amounts of $H_2$ begin to cause the output power to decrease, despite further catalyzing the recombination of CO and $O_2$ so as to increase the amount of $CO_2$ present.

Another known method to reduce the amount of $CO_2$ dissociated in the plasma discharge is to replace the $N_2$ with CO. The vibrational levels of CO and, in particular, the $V=1$ level, can act to excite the upper laser level of $CO_2$ by V-V transfer, much as $N_2$ and $CO_2$. The presence of excess CO in the gas mix forces the dynamic chemical equilibrium in the plasma back towards the formation of more $CO_2$ according to the following equation:

$$CO + \tfrac{1}{2}O_2 + e = CO_2 + e.$$

This can provide as much as 6.8 watts from the laser of the above example, even though all of the $CO_2$ does not remain intact. The applicant has found that $H_2$ in the presence of an excess of CO in the gas mix further returns the amount of $CO_2$ towards its initial concentration, even better than when $H_2$ is used in the presence of $N_2$ without the excess CO. Hydrogen and CO are more effective as a catalyst in combination than either alone. Unfortunately, at any useful concentration, i.e., added $H_2$ pressures of 0.5 torr or greater in a typical 108 torr gas mix, causes the output power of the laser to drop.

Clearly, there exists a need for a gain medium catalyst to recombine CO and $O_2$ in a carbon dioxide laser, wherein the catalyst is effective in the recombination process without substantially reducing the laser output power or output efficiency.

SUMMARY OF THE INVENTION

It is therefore a primary object of the present invention to provide an improved gas mixture for use as the gain medium in a radiant energy source.

It is a further object of the present invention to provide an improved waveguide laser having a gas mixture which produces increased power output.

It is a still further object of the present invention to provide an improved waveguide laser having a gas mixture which produces a highly efficient output signal at high power output.

It is yet a further object of the present invention to provide an improved $CO_2$ waveguide laser having a gas mixture including means for catalyzing CO and $O_2$ back to $CO_2$ without quenching any collisional energy transfer that may occur from CO to $CO_2$.

In accordance with the principles of the present invention, a gain medium for use in a radiant energy source comprises a gas mixture including carbon dioxide, carbon monoxide and deuterium.

In accordance with a preferred embodiment of the present invention, a gain medium for use in a carbon dioxide waveguide laser comprises a gas mixture having the following gases substantially in the recited proportions by volume: 61.6:11.1:18.4: 5.0:3.0:0.9:He:$CO_2$:$N_2$:CO:Xe:$D_2$.

With such arrangement, a carbon dioxide waveguide laser may be provided having the gas mixture of the present invention as its gain medium. A laser so provided will have a high power output, high efficiency, and will enjoy a long sealed-off lifetime.

BRIEF DESCRIPTION OF THE DRAWINGS

Other features and advantages of the present invention will be more fully understood from the following detailed description of the preferred embodiment, the appended claims, and the accompanying drawings, in which:

DESCRIPTION OF THE PREFERRED EMBODIMENT

Figure 1A:
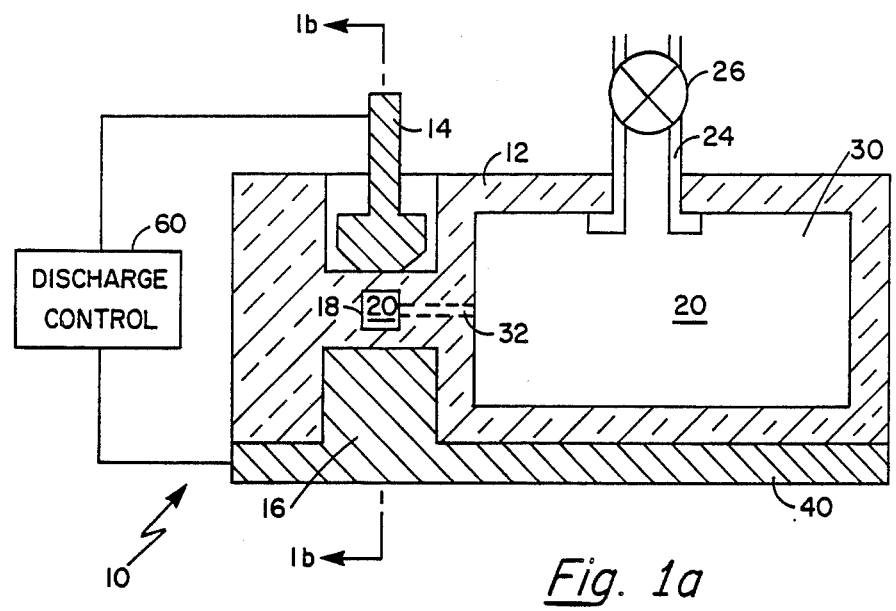
FIGS. 1a and 1b illustrate cross-sectional views of a typical waveguide laser in which the gas composition of the present invention may function as the gain medium.
Figure 1B:
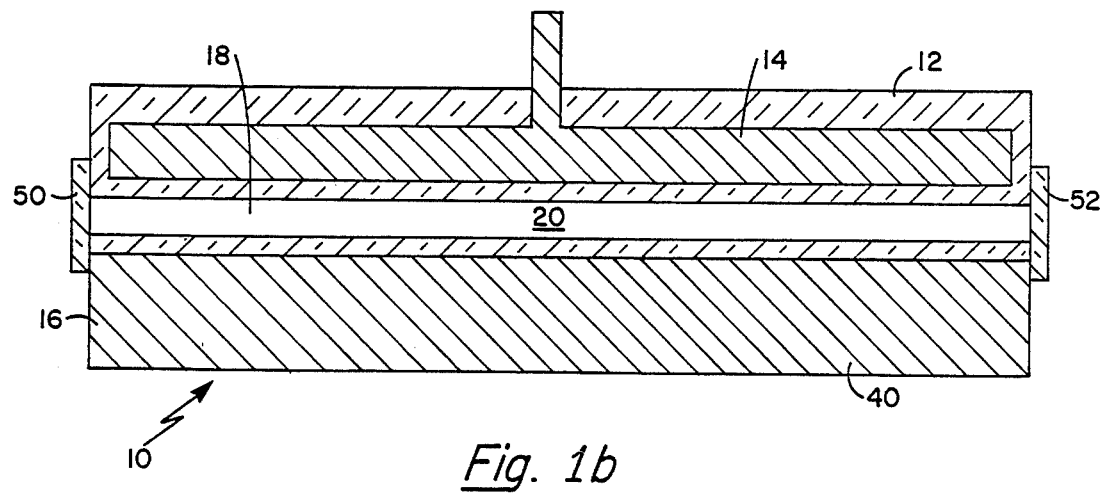

Referring to FIGS. 1a and 1b, there are shown cross-sectional views of a sealed-off carbon dioxide ($CO_2$) waveguide laser 10. Envelope 12, which is illustratively fabricated of a ceramic material, contains within waveguide section 18 a gain medium 20 which is the focus of the present invention. Waveguide section 18 is illustratively 24 cm in length and 2 mm on a side in cross section, for a total gas volume within the waveguide of approximately one cubic centimeter. Electrodes 14 and 16 are adjacent envelope 12 at the boundaries of waveguide section 18 and on opposite sides therefrom. Electrodes 14 and 16 extend along substantially the entire length of waveguide section 18. FIG. 1a illustrates a transverse view of waveguide section 18 while FIG. 1b provides a longitudinal view.

Discharge control 60 is provided to produce a discharge between electrodes 14 and 16. The discharge excites gain medium 20, thereby producing radiation emission. In a preferred embodiment, discharge control 60 provides a radio frequency (rf) signal through gain medium 20. It should be noted, however, that gain medium 20 may alternatively be excited by a dc signal. Either form of excitation may be employed either in a continuous or pulsed mode of operation. For a laser using rf excitation, electrode 16 is typically coupled to the ground plane 40.

When laser 10 is used in the resonator mode, a totally reflecting mirror 50 is placed on the optic axis of laser 10 at one end of waveguide section 18 and a partially transmitting mirror 52 is placed on the other optic axis at the opposite end of waveguide section 18. In other applications, mirrors 50 and 52 may be replaced by optical output windows, whose planes may be positioned at the Brewster angle with respect to the optic axis to control the polarization of the output laser pulses, as is well known in the art.

Gas ballast zone 30 communicates with waveguide section 18 of envelope 12 via passage 32, so as to permit laser 10 to contain a volume of gain medium 20 which is significantly greater than the volume of waveguide section 18. Gas fill port 24 represents means for filling and purging gas from gas ballast zone 30 (as well as passage 32 and waveguide section 18) through gas valve 26. However, it will be recognized that a laser in tactical use will include a permanent sealing means prior to deployment.

Figure 2:
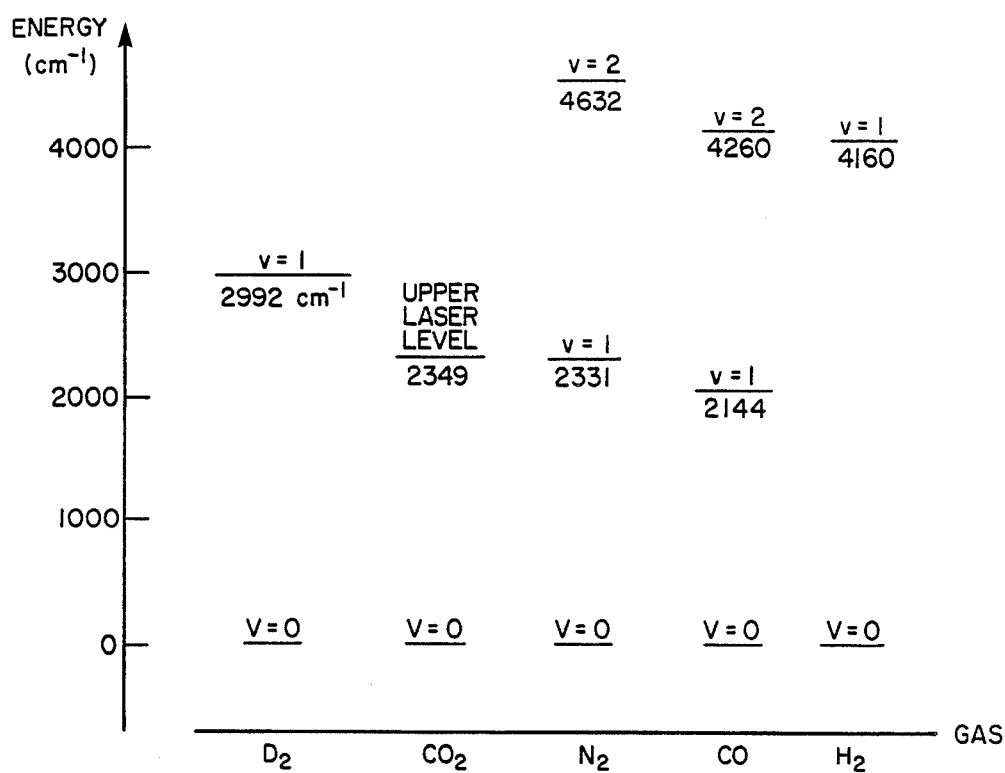
FIG. 2 is an energy state diagram illustrating the energy levels of the component gaseous elements of the mixture of the present invention.

In the discussion which follows, it is useful to refer to the energy state diagram of FIG. 2. It will be recalled from the background statement that gain medium catalysts currently used to recombine CO and $O_2$ in a carbon dioxide laser suffer from certain shortcomings. In particular, while hydrogen and carbon monoxide are effective as a catalyst, the addition of $H_2$ to the gain medium gas mixture reduces the output power of the laser.

An hypothesis has been developed to explain the power quenching effect of $H_2$ in CO gas mixes. When CO is being used to provide excitation of $CO_2$ by V-V transfer from, in particular, its $V=1$ level, the amount of CO reaching the $V=1$ level can be substantially reduced by the presence of $H_2$. In the plasma discharge, the CO molecules are excited to a number of low-lying vibrational energy levels by collisions with electrons, not just the $V=1$ level. As the CO molecules undergo collisions with other atoms or molecules, they relax their internal energy back toward the $V=1$ level. The process is short circuited at the $V=2$ level of CO, however, since this energy level can transfer energy almost resonantly with the $V=1$ level of $H_2$. Referring to FIG. 2, it will be seen that there exists only a 100 cm$^{-1}$ energy mismatch between the $V=2$ level of CO and the $V=1$ level of $H_2$. The hydrogen then loses the energy to walls or translational energy by V-T conversion. The $CO_2$ excitation is thereby greatly diminished.

To avoid this short circuit process, heavy hydrogen, or deuterium ($D_2$), is substituted for the $H_2$ in the present invention. Because of the isotope effect, i.e., the change in the vibrational energy level spacing is given by roughly the square root of the ratio of the reduced masses, the $D_2$ vibrational energy level manifold is no longer resonant at its lower levels with the CO vibrational energy levels. Whereas the addition of one torr $H_2$ in a $CO_2$-CO gas mix yields only 4-4.5 watts, and 6.8 watts was obtained in the absence of $H_2$, the addition of one torr $D_2$ to the $CO_2$-CO gas mix produces 6.9-7.1 watts of output power. Therefore, it has been demonstrated that the $D_2$ works substantially better than $H_2$ in CO-containing gas mixes in providing both catalyzation and high output power.

In accordance with the principles of the invention disclosed disclosed herein, a gas mixture for use as the gain medium of a carbon dioxide waveguide laser, which may be of the type illustrated in FIGS. 1a and 1b, includes carbon dioxide, carbon monoxide, nitrogen, helium, xenon and heavy hydrogen (deuterium). The $CO_2$ provides the gain; the He and Xe function as described earlier. The $N_2$ is retained for its ability to excite $CO_2$. The CO and $D_2$ are included because the catalyzation of CO and $O_2$ back to $CO_2$ is much more effective when hydrogen, or heavy hydrogen, is used in the presence of excess CO. Finally, $D_2$ is used instead of $H_2$ because, in addition to its excellent catalytic qualities, deuterium does not quench any collisional energy transfer that might occur from CO to $CO_2$.

In accordance with a preferred embodiment of the present invention, a gas mixture for use as the gain medium in a carbon dioxide waveguide laser, which may be of the type illustrated in FIGS. 1a and 1b, includes the following gases in the recited proportions (by volume):

| Helium | He | 61.6 |
| --- | --- | --- |
| Carbon dioxide | $CO_2$ | 11.1 |
| Nitrogen | $N_2$ | 18.4 |
| Carbon monoxide | CO | 5.0 |
| Xeron | Xe | 3.0 |
| Deuterium | $D_2$ | 0.9 |

A waveguide laser including the above-recited gas mixture as gain medium was built and tested. The laser produced an output signal at 8.8 watts for an applied input power of 90 watts. As will be understood by those knowledgable in the art to which it pertains, this represents a very high output for this type of laser. In addition, it will be recognized that these values of input and output power represent a high efficiency for such a laser type. It has also been found that this laser will produce even greater output power at slightly reduced efficiencies. An extended life test of this laser has demonstrated that the above-recited gas mixture is quite satisfactory. The laser retains 96 percent of its original output after five hundred hours of continuous operation.

While the principles of the present invention have been demonstrated with particular regard to the illustrated structure and compositions of the figures and the foregoing description, it will be recognized that various departures may be undertaken in the practice of the invention. As an example, while the gas mixture disclosed herein has been described for use as the gain medium of a waveguide laser, it will be recognized by those knowledgeable in the art that the disclosed gas mixture may be excited in a plasma in other radiant energy sources. The scope of this invention is therefore not intended to be limited to the particular structure and compositions disclosed herein, but should instead be gauged by the breadth of the claims which follow.

What is claimed is:

1. A gain medium for use in a radiant energy source comprising a gas mixture including carbon dioxide, carbon monoxide and deuterium.

2. The gas mixture according to claim 1 further including nitrogen.

3. The gas mixture according to claim 2 further including helium.

4. The gas mixture according to claim 3 further including xenon.

5. A gain medium for use in a carbon dioxide waveguide laser comprising a gas mixture having the following gases substantially in the recited proportions by volume: 61.6:11.1:18.4: 5.0:3.0:0.9:He:$CO_2$:$N_2$:CO:Xe:$D_2$.

6. A radiant energy source comprising:
a sealed envelope;
first and second electrodes adjacent boundaries of said envelope;
means coupled to said first and second electrodes for producing an electrical discharge within said envelope; and
a gain medium within said envelope for emitting radiation in response to said electrical discharge between said electrodes, said gain medium comprising a gas mixture including carbon dioxide, carbon monoxide and deuterium.

7. A waveguide laser comprising:
a sealed envelope including a waveguide section;
first and second electrodes adjacent said waveguide section;
means coupled to said first and second electrodes for producing an electrical discharge within said waveguide section; and
a gain medium within said envelope for emitting coherent radiation in response to said electrical discharge between said electrodes, said gain medium comprising a gas mixture including carbon dioxide, carbon monoxide and deuterium.

8. The waveguide laser according to claim 7 wherein said gas mixture further includes nitrogen, helium and xenon.

9. The waveguide laser according to claim 8 wherein said gas mixture includes the following gases substantially in the recited proportions by volume: 61.6:11.1:18.4:5.0:3.0:0.9:He: $CO_2$:$N_2$:CO:Xe:$D_2$.

* * * * *